United States Patent [19]

Kuhns

[11] Patent Number: 5,338,079
[45] Date of Patent: Aug. 16, 1994

[54] VEHICLE WITH PERFORATED PANELS

[75] Inventor: Dan A. Kuhns, Arthur, Ill.

[73] Assignee: E-Z Trail, Inc., Arthur, Ill.

[21] Appl. No.: 149,720

[22] Filed: Nov. 9, 1993

Related U.S. Application Data

[63] Continuation of Ser. No. 934,019, Aug. 21, 1992, abandoned.

[51] Int. Cl.$^5$ .............................................. B60P 3/22
[52] U.S. Cl. .................................. 296/15; 296/32; 296/180
[58] Field of Search .................. 296/15, 32, 36, 180, 296/181; 280/410, 477, 770; 414/519, 526

[56] References Cited

U.S. PATENT DOCUMENTS

| | | | |
|---|---|---|---|
| 941,956 | 11/1909 | Sanders et al. | 296/32 |
| 1,119,585 | 12/1914 | Eldredge | 296/32 X |
| 4,139,230 | 2/1979 | Barrentine et al. | 296/15 X |
| 4,611,824 | 9/1986 | McIntosh | 280/770 X |
| 4,861,093 | 8/1989 | Chapman | 296/180.1 |
| 5,013,208 | 5/1991 | Grieshop | 414/519 X |

OTHER PUBLICATIONS

*C-Thru Bin Extensions for Ford, Massey Ferguson, White & Gleaner,* Goodall Products, undated.

Primary Examiner—David M. Mitchell
Assistant Examiner—Andrew C. Pike
Attorney, Agent, or Firm—Lockwood, Alex, Fitzgibbon & Cummings

[57] ABSTRACT

A towable wheeled vehicle or grain cart for transporting a loose cargo, such as grain, includes a perforated panel in the front and rear walls thereof for observing the status of fill of the cargo and to permit visibility to the rear thereof when the vehicle or grain cart is in transit or is being positioned.

15 Claims, 1 Drawing Sheet

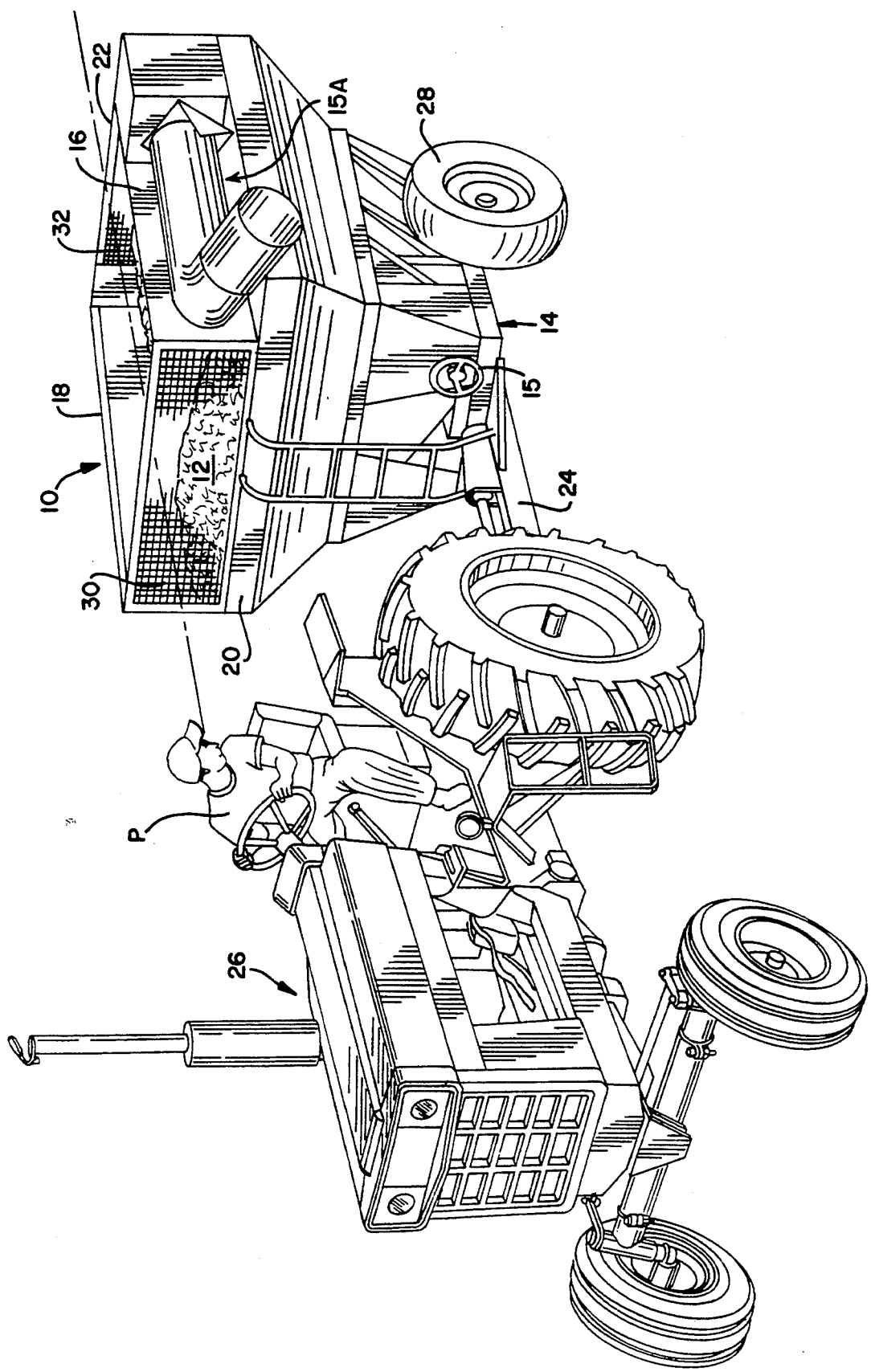

VEHICLE WITH PERFORATED PANELS

This application is a continuation of application Ser. No. 07/934,019, filed Aug. 21, 1992, now abandoned.

BACKGROUND AND SUMMARY OF THE INVENTION

The present invention relates to a wheeled vehicle which is adapted to be towed for transporting a loose cargo and, more particularly, to a grain cart for transporting loose grain or the like.

Grain carts have been widely employed in the agricultural industry for the transport of harvested grains, such as wheat and corn, from the field during harvest. Typically such grain carts are towed behind a combine and, as the grain is separated from its extraneous plant material by the combine, it is discharged into the towed grain cart. Once the grain cart has been filled, it is detached from the combine and attached to a towing vehicle, such as a tractor, which tows the filled grain cart, frequently in major part over public roads or highways, to the location where the grain is to be stored, such as a grain elevator. In the meantime a second grain cart is hitched to the combine to continue to receive the harvested grain, while the filled grain cart is in transit to and from its discharge location.

It is advantageous if the status of fill of the grain cart, particularly toward the completion of fill, can be visually observed by the combine operator to prevent overfilling of the grain cart and spilling of the grain. Storage tanks which have been stationarily mounted directly on and as part of the combine for receiving the harvested grains have included perforated extension walls on the tanks in the past. These perforated extension walls primarily have the purpose of increasing the storage capacity of the combine-mounted tank. However, due to their perforated construction, they also incidentally permitted the combine operator to determine the status of fill of the tank. Such perforated extension walls, however, have not served any purpose to the present inventor's knowledge which assisted the combine operator in the operation or navigation of the combine either in the field or on public highways or roads. In fact, the extension walls frequently must be removed when the combine is to transit a public road due to bridge and other height restrictions.

It is also advantageous if the construction of such grain carts would permit visual viewing through the cart and to its rear by the operator of the towing vehicle when the grain cart is in transit on a public highway or other road or when it is being backed to maneuver it into a desired position. Such visibility permits the operator to determine whether any other vehicles are following or whether any obstructions are present. This is important from the standpoint of safety particularly where the grain cart is to be towed at a relatively slow rate of speed because such grain carts are typically of large and bulky size so as to obstruct visibility to the rear.

One approach in the past has involved the provision of upper panels on the grain cart of solid sheets of transparent plastic materials. The disadvantage of such plastic panels is that over the course of time they become foggy both due to the interaction of solar radiation with the plastic and the abrasion and scratching caused by the grains which are transported. Moreover, such panels are relatively weak structurally and, if their thickness is increased to improve their strength, they become relatively expensive and heavy.

The vehicle of the present invention is inexpensive and both simple in construction and use, overcomes the disadvantages of the aforementioned plastic panels, and permits the visual observation not only of the status of fill of the grain cart, but also visibility to the rear of the grain cart by the operator of a towing vehicle when the grain cart is in transit in traffic or being backed to position it.

In one principal aspect of the present invention, a towable wheeled vehicle for transporting a loose cargo includes a bottom, a pair of spaced side walls, and substantially impervious front and rear walls for containing the cargo, and a towing hitch adjacent the front wall for hitching the vehicle to a personnel-operated towing vehicle. The towable vehicle includes a perforated panel on the front and rear walls having perforations of a size and shape to contain the loose cargo. The perforated panels are positioned at an elevation to permit visibility through and to the rear of the towable vehicle by the operator of the towing vehicle when the towable vehicle is being towed or positioned.

In still another principal aspect of the present invention, the aforementioned perforated panel extends substantially across the width of the front wall adjacent its top and the perforated panel of the rear wall is positioned adjacent its top and at substantially the same elevation as the perforated panel of the front wall.

In still another principal aspect of the present invention, the towable vehicle is a grain cart for transporting loose grain, and the perforations are sized and shaped to contain the loose grain.

In still another principal aspect of the present invention, the perforated panels are formed of a metal mesh.

These and other objects, features, and advantages of the present invention will be more clearly understood through a consideration of the following detailed description.

BRIEF DESCRIPTION OF THE DRAWING

In the course of this description, reference will frequently be made to the attached drawing in which the sole figure is a perspective view of a towable vehicle or grain cart constructed in accordance with the principles of the present invention, and of a towing vehicle or tractor in the process of towing the towable vehicle or grain cart.

DESCRIPTION OF THE PREFERRED EMBODIMENT

The preferred embodiment of the invention, as shown in the sole figure of the drawing, comprises a towable vehicle 10 which, as shown, may comprise a grain cart for containing and transporting a loose cargo, such as harvested corn or wheat 12 therein. The towable vehicle or grain cart 10 includes a bottom 14 which, in the case of a grain cart, is preferably of hopper construction and adapted to discharge the cargo therefrom. For this purpose a handwheel 15 is shown for operating an appropriate door (not shown) at the bottom 14. In the alternative, the grain cart may be unloaded by an auger unit 15A. Such hopper construction, doors, and auger units are conventional in grain carts and the specific details thereof do not constitute a principal aspect of the invention and, therefore, will not be described in detail herein.

The towable vehicle 10 also includes a pair of spaced substantially impervious side walls 16 and 18 and substantially impervious front and rear walls 20 and 22, respectively, all for containing the cargo. The towable vehicle 10 also includes a towing hitch or bar 24 by which the towable vehicle is adapted to be hitched to a suitable towing vehicle, such as a tractor 26, for transporting the vehicle 10 on wheels 28 to, from, and in the field.

In the preferred embodiment of towable vehicle 10 of the present invention, a pair of perforated panels 30 and 32 are mounted adjacent the top of the impervious front and rear walls 20 and 22, respectively. The perforated panels 30 and 32 may be formed of any material which is of sufficient strength and endurance to contain and hold the loose cargo during transport and over extended usage. A metal mesh is preferred. The size of the perforations in the front and rear panels 30 and 32 should be small enough to prevent leakage of the loose materials, such as grain, through the panels. The panels 30 and 32 are preferably stationarily affixed adjacent the tops of the front and rear walls 20 and 22 by a suitable method such as by welding or bolts.

Although as shown in the drawing, it is preferred that the panels which form the upper portions of the side walls 16 and 18 be solid to enhance the strength of the grain cart, it will be appreciated that these panels may also be perforated if desired to improve the ability to view the status of fill of the grain cart from all sides thereof.

As shown in the drawing, the front perforated panel 30 preferably extends substantially across the width of the grain cart whereas the rear perforated panel 32 extends only across a portion of the width. However, it will be appreciated that the front panel 30 may also extend only across a portion of the width of the grain cart 10 and/or the rear perforated panel 32 may extend across the entire width of the grain cart. What is important is that the width of the panels 30 and 32 are sufficient to permit the person P who is operating the towing vehicle 26 to visually sight through the grain cart during towing to observe any traffic to his rear or to view obstructions to the rear of the grain cart when backing the cart to position it. In this regard, the perforated panels 30 and 32 are preferably positioned at substantially the same elevation as each other and in the line of sight of the person P as shown in the drawing.

From the foregoing, it will be seen that the towable vehicle 10 of the present invention not only permits direct visual observation of the status of fill of the vehicle or grain cart as its fill approaches completion, but also permits visual traffic and obstacle observation through and to the rear of the vehicle or grain cart during towing and positioning.

It will be understood that the embodiment of the present invention which has been described is merely illustrative of one of the applications of the principles of the invention. Numerous modifications may be made by those skilled in the art without departing from the true spirit and scope of the invention.

I claim:

1. A towable wheeled vehicle for transporting a loose cargo having a bottom, a pair of substantially impervious spaced side walls, and substantially impervious front and rear walls extending upwardly from the bottom of the vehicle over a major portion of the height of the vehicle for containing the cargo, and a towing hitch adjacent the front wall for hitching the vehicle to a personnel operated towing vehicle, said towable vehicle comprising:

a pair of perforated panels, one each on said impervious front and rear walls respectively, said perforated panels having perforations of a size and shape to contain said loose cargo, both of said perforated panels being positioned adjacent the top of said impervious front and rear walls to permit visibility through and to the rear of the towable vehicle by the person operating the towing vehicle when the towable vehicle is being towed or positioned, the width of said perforated panels being substantially greater than their height and their height being substantially less than the distance between the bottom of the towable vehicle and the top of said impervious front and rear walls to permit observation by the person operating the towing vehicle through said perforated panels of any traffic or obstruction to the rear of the towable vehicle as it is being towed or positioned, and at least one of said side walls extending upwardly to adjacent the top of said perforated panels and a substantial portion of said at least one of said side walls is substantially imperforate from top to bottom.

2. The towable vehicle of claim 1, wherein said perforated panel on said front wall extends substantially across the width of said front wall adjacent its top, and said perforated panel on said rear wall is positioned adjacent the top of said rear wall and at substantially the same elevation as the perforated panel on said front wall.

3. The towable vehicle of claim 2, wherein said towable vehicle is a grain cart for transporting loose grain and said perforations are sized and shaped to contain the loose grain.

4. The towable vehicle of claim 2, wherein said perforated panels are formed of a metal mesh.

5. The towable vehicle of claim 1, wherein said towable vehicle is a grain cart for transporting loose grain and said perforations are sized and shaped to contain the loose grain.

6. The towable vehicle of claim 5, wherein said perforated panels are formed of a metal mesh.

7. The towable vehicle of claim 5, wherein said perforated panel on said rear wall extends across less than the width of said rear wall with the remainder of the width being substantially imperforate.

8. The towable vehicle of claim 5, wherein said perforated panel on said rear wall extends across less than the width of said rear wall with the remainder of the width being substantially imperforate.

9. The towable vehicle of claim 5, wherein both of said side walls extend upwardly to adjacent the top of said perforated panels and are substantially imperforate from top to bottom.

10. The towable vehicle of claim 1, wherein said perforated panels are formed of a metal mesh.

11. The towable vehicle of claim 1, wherein said perforated panel on said rear wall extends across less than the width of said rear wall with the remainder of the width being substantially imperforate.

12. The towable vehicle of claim 1, wherein both of said side walls extend upwardly to adjacent the top of said perforated panels and are substantially imperforate from top to bottom.

13. A towable wheeled vehicle for transporting a loose cargo having a bottom, a pair of substantially impervious spaced side walls, and substantially impervious front and rear walls extending upwardly from the bottom of the vehicle for containing the cargo, and a towing hitch adjacent the front wall for hitching the vehicle to a personnel operated towing vehicle, said towable vehicle comprising:

a pair of perforated panels, one each on said front and rear walls respectively, said perforated panels having perforations of a size and shape to contain said loose cargo, both of said perforated panels being positioned adjacent the top of said impervious front and rear walls to permit visibility through and to the rear of the towable vehicle by the person operating the towing vehicle when the towable vehicle is being towed or positioned, the height of said perforated panels being substantially less than the distance between the bottom of the vehicle and the top of said impervious front and rear walls, and at least one of said side walls extends upwardly to adjacent the top of said perforated panels and a substantial portion of said at least one of said side walls is substantially imperforate from top to bottom.

14. The towable vehicle of claim 13, wherein both of said side walls extend upwardly to adjacent the top of said perforated panels and are substantially imperforate from top to bottom.

15. The towable vehicle of claim 14, wherein said perforated panel of said rear wall extends across less than the width of said rear wall with the remainder of the width being substantially imperforate.

* * * * *